(12) United States Patent
Mizuno

(10) Patent No.: US 6,805,376 B2
(45) Date of Patent: Oct. 19, 2004

(54) INFLATOR WITH SHOCK WAVE GENERATOR

(75) Inventor: Hideki Mizuno, Omihachiman (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 10/305,026

(22) Filed: Nov. 27, 2002

(65) Prior Publication Data

US 2003/0116949 A1 Jun. 26, 2003

(30) Foreign Application Priority Data

Dec. 25, 2001 (JP) ........................................ 2001-392077
Sep. 30, 2002 (JP) ........................................ 2002-286163

(51) Int. Cl.⁷ ............................................. B60R 21/26
(52) U.S. Cl. ........................ 280/737; 280/736; 102/531
(58) Field of Search ............................. 280/741, 736, 280/737; 102/531, 530; B60R 21/26

(56) References Cited

U.S. PATENT DOCUMENTS

| | | | | |
|---|---|---|---|---|
| 3,807,755 A | * | 4/1974 | Mason, Jr. ................. | 280/736 |
| 5,031,932 A | * | 7/1991 | Frantom et al. ............ | 280/741 |
| 5,762,368 A | * | 6/1998 | Faigle et al. ................ | 280/737 |
| 6,170,868 B1 | | 1/2001 | Butt et al. | |
| 6,273,462 B1 | | 8/2001 | Faigle et al. | |
| 6,296,274 B1 | * | 10/2001 | Stevens et al. ............. | 280/741 |
| 6,584,911 B2 | * | 7/2003 | Bergerson et al. .......... | 102/530 |
| 6,629,703 B2 | * | 10/2003 | Horton et al. ............... | 280/737 |

FOREIGN PATENT DOCUMENTS

| | | |
|---|---|---|
| EP | 0 800 966 A1 * | 10/1997 |
| JP | 2001-191890 | 7/2001 |
| WO | WO01/42047 | 6/2001 |

OTHER PUBLICATIONS

"Air Bag Inflator Having Thrust Neutral Connection", Research Disclosure, Kenneth Mason Publications, Hampshire, GB, NR. 440, p. 2136 XP001052475, Issn: 0374–4353.

* cited by examiner

Primary Examiner—Ruth Ilan
(74) Attorney, Agent, or Firm—Manabu Kanesaka

(57) ABSTRACT

A pressure container stores gas therein, and includes a tube facing a gas exit at one end thereof. An initiator is fitted into a rear end of the tube. A burst disk closes the gas exit and is arranged to break upon receipt of a shock wave. A closure disk closes a distal end of the tube. The tube is filled with a gas with a pressure lower than that in the container. The initiator ejects a high-pressure gas into the tube to generate a shock wave. The shock wave breaks the closure disk and propagates in the container, and then bursts the burst disk when it reaches the gas exit.

6 Claims, 5 Drawing Sheets

INFLATOR WITH SHOCK WAVE GENERATOR

BACKGROUND OF THE INVENTION AND RELATED ART STATEMENT

The present invention relates to an inflator suitable for inflating an airbag or the like for protecting an occupant in a vehicle.

In U.S. Pat. No. 6,273,462, an inflator for inflating an airbag for protecting an occupant in a vehicle has been disclosed. When actuated, an initiator generates a shock wave to open a gas exit. FIG. 2 is a cross sectional view of the inflator disclosed in U.S. Pat. No. 6,273,462.

An inflator 100 is provided with a substantially cylindrical pressure container 104 having a gas storage 102 filled with a high-pressure gas. A gas jet port 106 formed as a circular opening is provided at an axial end (distal end) of the pressure container 104. A burst disk 108 formed of a metal sheet or the like closes the gas jet port 106. The burst disk 108 is adapted to be burst and open the gas jet port 106 when a pressure in the gas storage 102 exceeds a predetermined value, or when an initiator 116 applies a shock wave, which will be described later.

An initiator housing 114 for storing the initiator is provided at the other end (rear end) of the pressure container 104. The initiator housing 114 has a substantially cylindrical shape projecting from the rear end of the pressure container 104 into the gas storage 102 toward the gas jet port 106. The initiator 116 for generating a shock wave is installed in the initiator housing 114.

The initiator 116 is actuated when a pair of electrodes 118, 120 extending from a rear end thereof for conducting power is energized. The initiator generates a gas with a pressure higher than an internal pressure of the gas storage 102. A difference in the pressures is sufficient for generating a shock wave in the gas storage 102. The initiator ejects the high-pressure gas instantaneously from the distal end thereof into the gas storage 102.

In the inflator 100 thus constructed, when the initiator 116 is actuated and the high-pressure gas is ejected from the initiator 116 into the gas storage 102, a shock wave is generated in the gas storage 102 due to the pressure difference between the pressure of the gas from the initiator 116 and the pressure of the gas in the gas storage 102. The shock wave is propagated in the gas storage 102 toward the gas jet port 106. When the shock wave reaches the burst disk 108 closing the gas jet port 106, the burst disk 108 is burst due to the shock wave before a total pressure in the gas storage 102 reaches to a bursting pressure of the burst disk 108, and thus the gas jet port 106 is opened. As a result, the gas is ejected from the inflator 100.

In the inflator 100, a substantially cap shaped diffuser 110 is fitted on the gas jet port 106 at the distal end of the pressure container 104. Therefore, when the burst disk 108 bursts, the gas in the gas storage 102 passes from the gas jet port 106 through the diffuser 110, and is ejected to the outside through orifices 112 formed on a peripheral side surface of the diffuser 110.

As described above, in the inflator 100, the gas is ejected through the jet port 106 when the burst disk 108 is broken before the total gas pressure in the gas storage 102 reaches the burst strength of the burst disk 108. Thus, the gas with a relatively low pressure may be ejected from the jet port 106 for a relatively long period of time. Consequently, the airbag may be inflated relatively slowly and the internal pressure of the airbag may be maintained at a high level for a relatively long period of time.

In the inflator 100 shown in the FIG. 2, the initiator 116 is adapted to generate the shock wave by ejecting the gas toward the inside of the high-pressure gas storage 102, and thus the initiator 116 is required to have a high-performance to rapidly generate the gas with a pressure sufficiently higher than that of the gas filled in the gas storage 102. When an initiator having an inferior performance is used, it is possible that the generated shock wave is not strong enough, and thus may not reach the burst disk 108, or even if it reaches, it may be too weak to burst the burst disk. Therefore, in such a case, it is necessary to shorten a length of the pressure container of the inflator so that the shock wave can reach the burst disk.

It is an object of the present invention to provide an inflator in which a shock wave is generated even when the initiator does not rapidly generate the high-pressure gas as described above, and the shock wave breaks the gas exit of the pressure container to allow the gas to be ejected.

Other objects and advantages of the invention will be apparent from the following disclosure of the invention.

SUMMARY OF THE INVENTION

An inflator according to the present invention includes a pressure container having a gas exit that opens upon receipt of a shock wave at one end and being filled with a high-pressure gas therein, and a shock wave generator provided on the other end of the pressure container for generating the shock wave toward the gas exit. The shock wave generator has a tube and an initiator. The tube has a distal end that is broken when the distal end receives the shock wave from inside. The shock wave passes through the distal end toward the gas exit of the pressure container. The tube is filled with a gas having a pressure lower than that of the high-pressure gas in the pressure container. The initiator is provided at a rear end of the tube for emitting the shock wave into the tube when the inflator is actuated.

In the inflator according to the present invention as described above, when the initiator is actuated, the shock wave is generated in the tube by a pressure difference between the gas generated by the initiator and the gas in the tube. Then, the distal end of the tube that received the shock wave is broken to generate additional shock wave due to the pressure difference between the gas in the tube and the gas in the pressure container. The shock wave propagates rapidly in the pressure container, reaches the gas exit of the pressure container, and breaks the gas exit to open. Accordingly, the gas is ejected from the pressure container.

In the present invention, the initiator is provided in the tube filled with the gas having a relatively low pressure. The initiator ejects the gas toward the inside of the tube to generate the shock wave. Therefore, the shock wave can be generated even when the gas pressure generated upon the actuation of the initiator is lower than that of the initiator 116 in the above-described U.S. Pat. No. 6,273,462. Therefore, it is possible to use the initiator with a simple structure and a low cost.

The inflator of the present invention is preferably provided with a booster for promoting the generation of the shock wave by the initiator in the tube.

The booster includes, for example, a propellant (gas forming agent) that induces a gas generation reaction when the initiator generates the gas. When the initiator generates the gas, the booster generates the gas as well to increase the gas pressure generated by the initiator, thereby promoting the generation of the shock wave in the tube.

With the booster provided in the tube, the initiator can have a lower output to generate the shock wave. Therefore, it is possible to use the initiator with a further simpler structure and a lower cost. Even when a pressure container of relatively high capacity is used, or an internal gas pressure is set at a high value, it is possible to use the initiator that can only generates a relatively low-pressure gas to generate the shock wave strong enough for opening the gas exit of the pressure container.

DETAILED DESCRIPTION OF PREFERRED EMBODIMENTS

Figure 1:
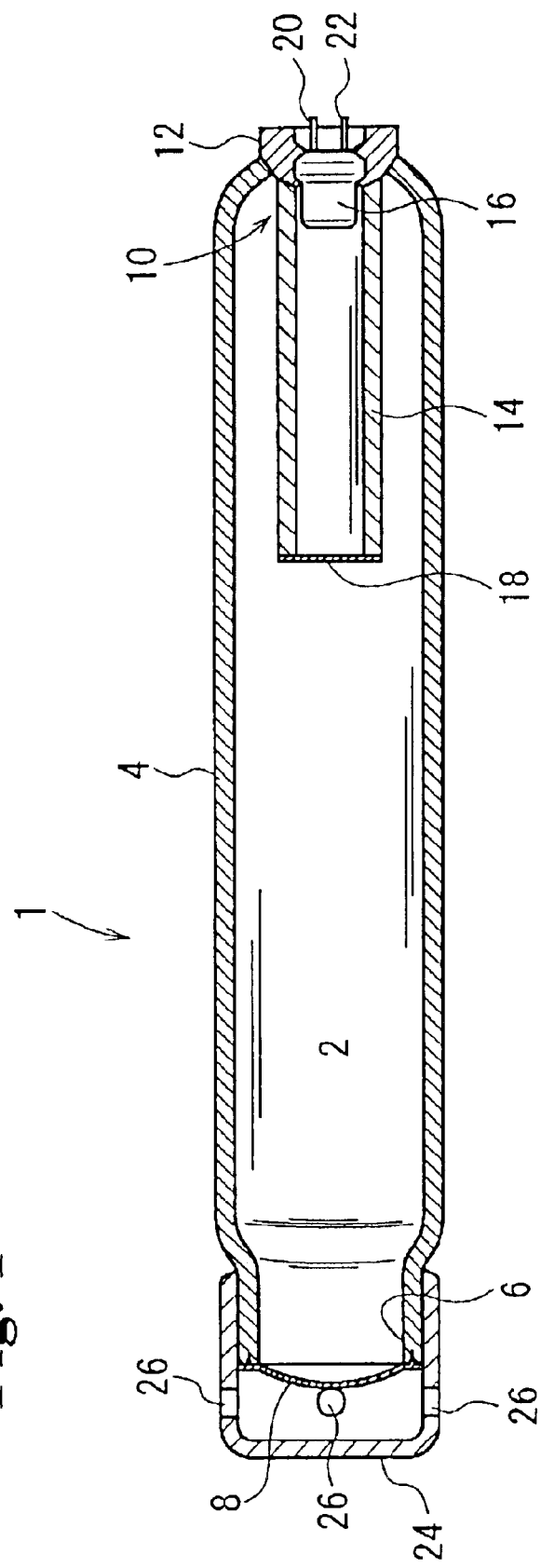
FIG. 1 is a cross sectional view showing an inflator according to an embodiment of the present invention.

Hereunder, embodiments of the present invention will be described with reference to the accompanying drawings. FIG. 1 is a cross sectional view showing an inflator according to an embodiment of the present invention.

An inflator 1 includes a substantially cylindrical pressure container 4 having a gas storage 2 filled with a high-pressure gas. A gas jet port 6 is provided at an axial end (distal end) of the pressure container 4. A burst disk 8 closes the gas jet port 6. The burst disk 8 is adapted to break and open the gas jet exit 6 upon receiving a shock wave from a shock wave generator 10 that will be described later.

The shock wave generator 10 is provided on the other end (rear end) of the pressure container 4 for generating the shock wave to burst the burst disk 8. The shock wave generator 10 includes an initiator housing 12 attached at the rear end of the pressure container 4 for installing the initiator therein; a tube 14 disposed in the gas storage 2 and extending from the initiator housing 12 toward the gas jet port 6; an initiator 16 installed at the rear end of the pressure container 4 via the initiator housing 12 and having a proximal end fixed to a base side of the pressure container; and a closure disk 18 closing the distal end of the tube 14 and arranged to burst upon generation of the shock wave in the tube 14 for opening the distal end of the tube 14. In a state that the closure disk 18 closes the tube 14, the tube 14 is filled with a gas at a pressure lower than an internal pressure of the gas storage 2. It is preferable to have a large difference between the gas pressure in the tube 14 and the gas pressure in the gas storage 2. For example, assuming that the gas pressure in the tube is one atmosphere, a preferable gas pressure in the gas storage is 1.5 times higher than the gas pressure in the tube.

The gas filled in the tube 14 and the gas storage 2 may be an incombustible gas, for example, air, nitrogen, or helium.

The initiator 16 is adapted to actuate when electrodes 20, 22 provided at the rear end for conducting power are energized. Then, the initiator 16 generates a gas with a pressure higher than that of the gas in the tube 14. The pressure is high enough to generate the shock wave in the tube 14.

In the inflator 1 thus constructed, when the initiator is actuated and the high-pressure gas is ejected from the initiator 16 into the tube 14, the shock wave is generated in the tube 14 due to the pressure difference between the gas generated by the initiator and the gas in the tube 14. The shock wave propagates in the tube 14 rapidly toward the distal end of the tube 14 to burst the closure disk 18. Subsequently, the shock wave is generated due to a difference between the gas pressure in the gas storage 2 and the pressure generated by the shock wave from the shock wave generator 10, and then propagates in the gas storage 2 toward the gas jet port 6. When the shock wave reaches the burst disk 8 closing the gas jet port 6, the burst disk 8 is broken by the shock wave before the total pressure in the gas storage 2 reaches the bursting pressure of the burst disk 8, and opens the gas jet port 6. Accordingly, the gas is ejected from the inflator 1.

In the present embodiment, the closure disk 18 closes the distal end of the tube 14. Thus, the gas pressure generated by the initiator combined with the low-pressure gas in the tube becomes a compressive pressure during a period until the closure disk is burst by the shock wave. The compressed gas generates heat. Accordingly, the closure disk is burst not only by the shock wave, but also by heat expansion, and thus an effective discharge of the gas is achieved.

In the case of the above-described U.S. Pat. No. 6,273, 462, the initiator housing is not closed, thus there is no heat generation and only the shock wave is generated.

In this embodiment, a diffuser 24 is fitted at the distal end of the pressure container 4. The gas ejected from the gas jet port 6 passes through the diffuser 24, and is ejected out through orifices 26 formed on a peripheral side surface of the diffuser 24.

Figure 2:
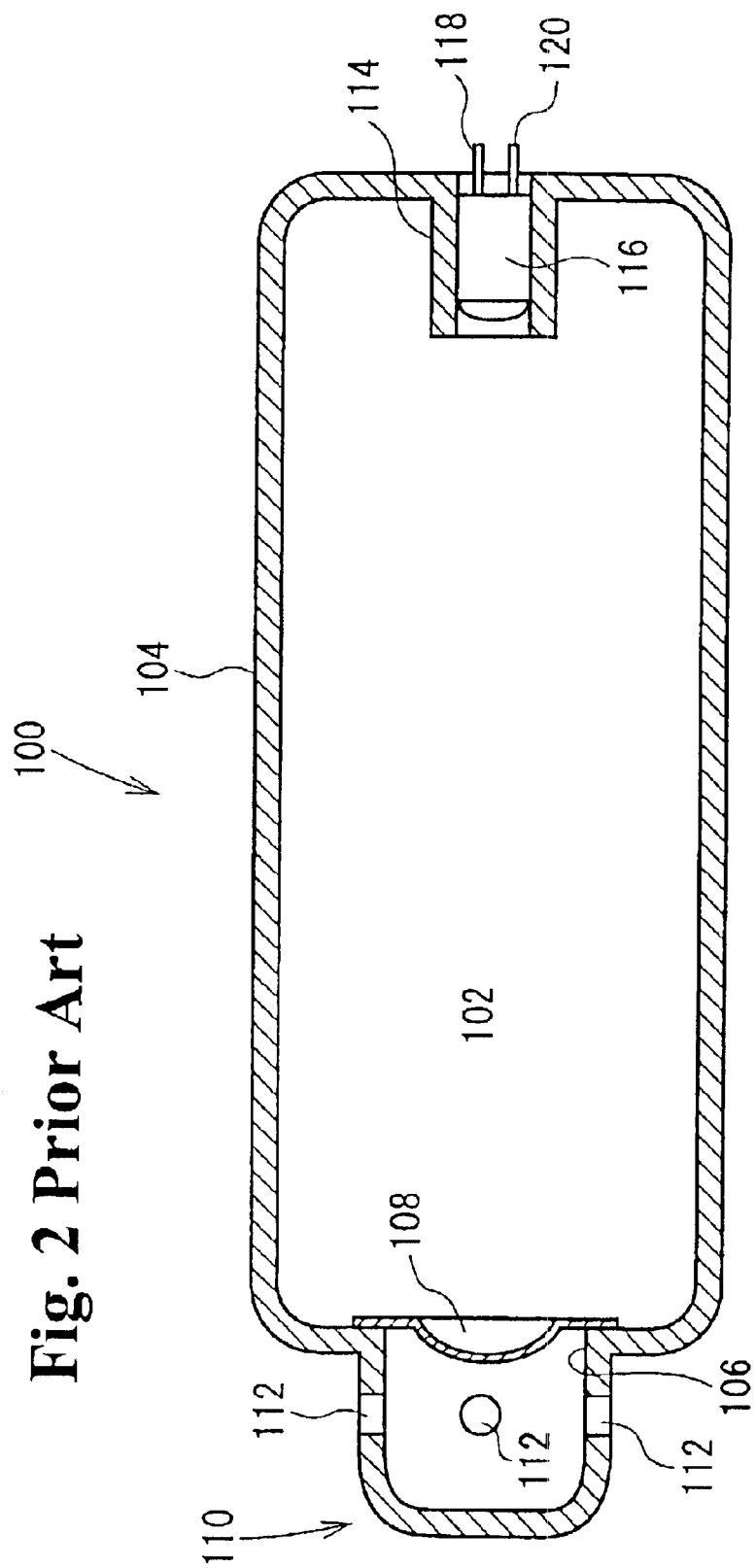
FIG. 2 is a cross sectional view showing a conventional inflator.

In the inflator 1, the shock wave is generated in the tube 14 by ejecting the gas from the initiator 16 toward the tube 14 where the gas pressure is lower than that of the gas storage 2. Thus, it is possible to generate the shock wave even when the pressure of the gas generated from the initiator 16 is lower than the pressure of the gas generated from the initiator 116 shown in FIG. 2. The pressure in the tube 14 is lower than that in the gas storage 2, and it may be, for example, a pressure as low as the atmospheric pressure. Therefore, the pressure of the gas generated from the initiator 16 for generating the shock wave in the tube 14 does not need to be so high, and an initiator with a relatively low output can generate the shock wave in the tube 14.

Accordingly, as the inflator 1, it is possible to use an initiator with a simple structure and a low cost.

Figure 3:
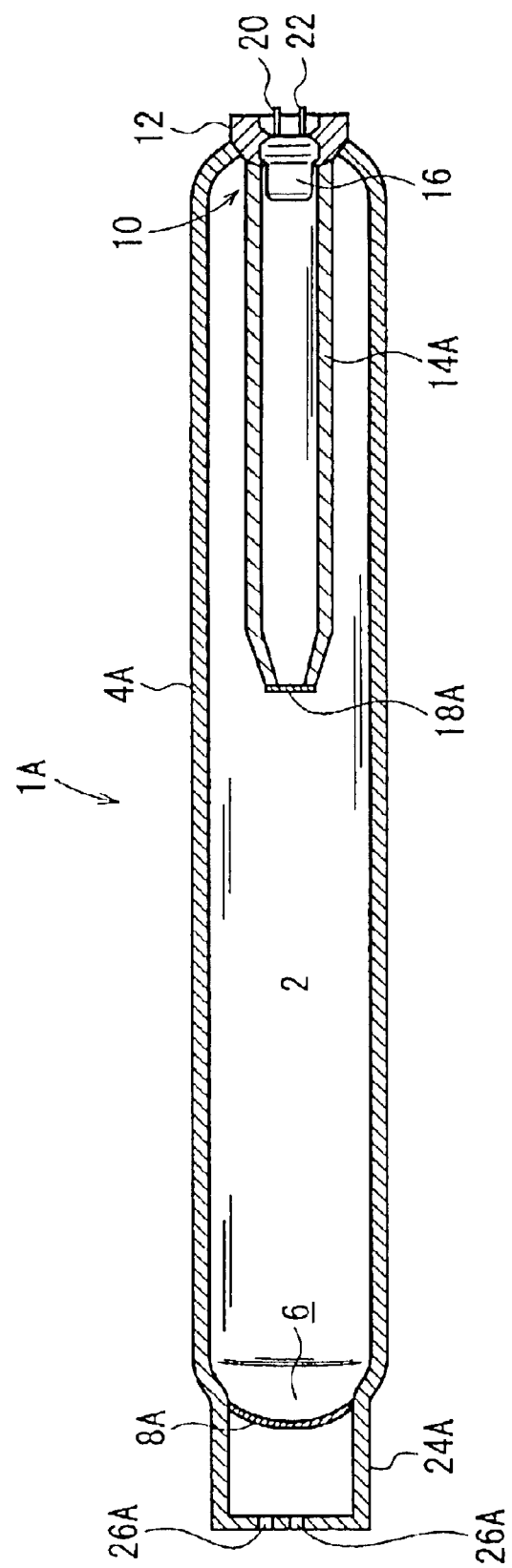
FIG. 3 is a cross sectional view showing an inflator according to an another embodiment.

FIG. 3 is a cross sectional view showing an inflator 1A according to another embodiment of the present invention. In this embodiment, a diffuser 24A is integrally provided at a distal end of a pressure container 4A, and orifices 26A are formed on a distal end surface of the diffuser 24A. Consequently, a gas from the gas jet port 6 is directly discharged in an axial direction of the pressure container 4A.

In this embodiment, a tube 14A of the shock wave generator 10 is tapered toward a closure disk 18A. Accordingly, the generated shock wave easily propagates to a burst disk 8A.

In the inflator 1A, the pressure container 4A is elongated, and the tube 14A is also elongated. Thus, even when the initiator 16 of the shock wave generator 10 and burst disk 8A are away from each other, and the shock wave hardly propagates due to the elongated pressure container 4A, the shock wave is discharged at a position closer to the burst disk 8A because the tube 14A is also elongated. Therefore, the burst disk 8A is broken without a problem, whereby an output of the initiator 16 does not have to be increased even if the inflator is elongated.

Figure 4:
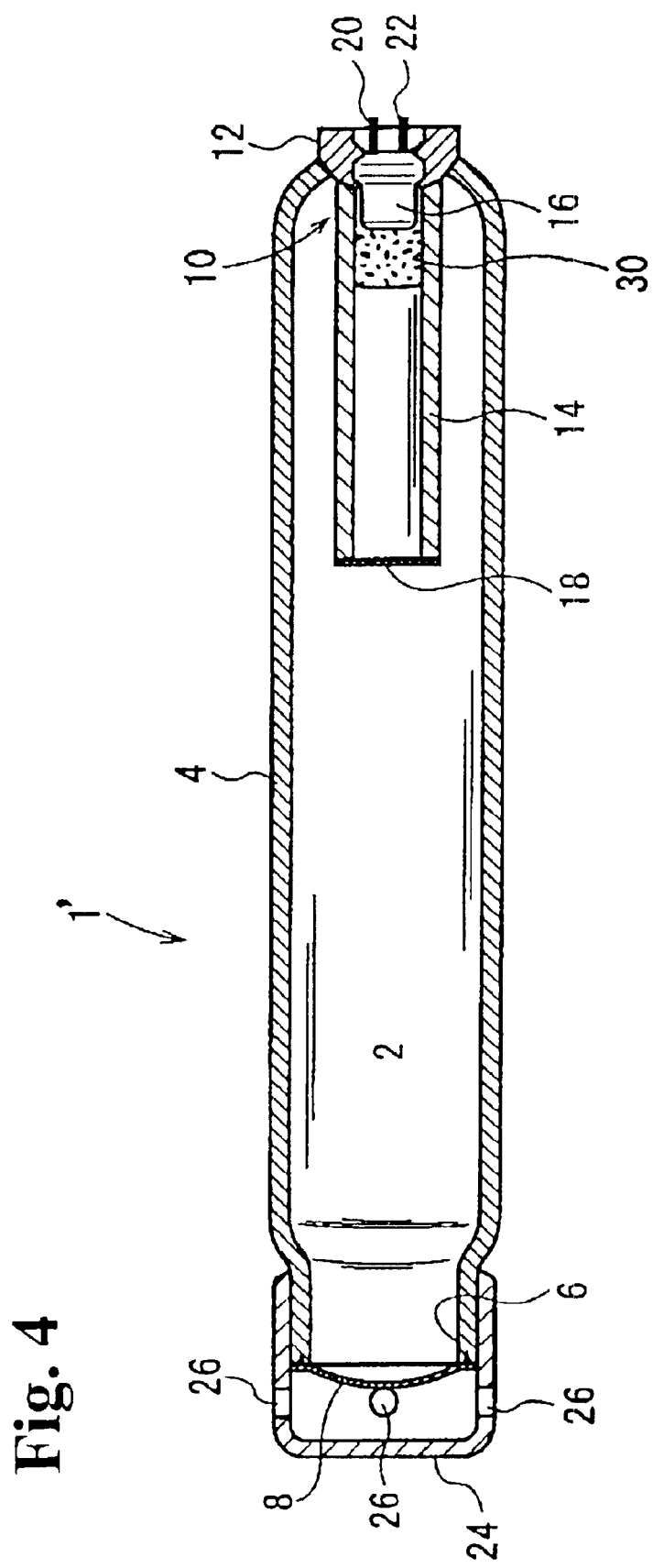
FIG. 4 is a cross sectional view showing an inflator according to a further embodiment.
Figure 5:
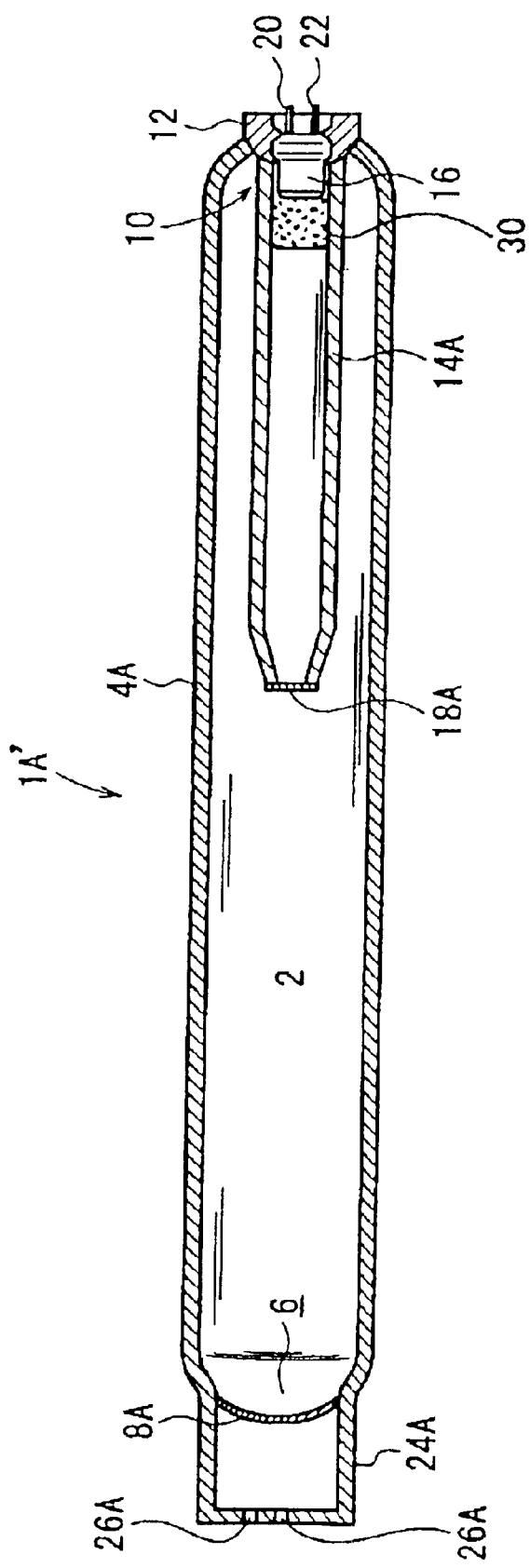
FIG. 5 is a cross sectional view showing an inflator according to a still further embodiment.

FIG. 4 and FIG. 5 are cross sectional views showing the inflators according to different embodiments of the present invention, respectively showing structures in which a booster is provided in the tube for promoting the generation of the shock wave by the initiator.

In inflators 1', 1A' in FIG. 4 and FIG. 5, a booster 30 is provided in the tubes 14, 14A respectively so as to be adjacent to a distal end of the initiator 16. The booster 30 includes a propellant (gas generating agent) that induces a gas generation reaction upon the actuation of the initiator 16. When the initiator 16 starts to generate the gas, the booster generates the gas to increase a pressure of the gas generated by the initiator 16, and to promote the generation of the shock wave in the tubes 14, 14A.

The inflators 1', 1A' have the same structure as the inflator 1 in FIG. 1 and the inflator 1A in FIG. 3, except that the booster 30 is provided in the tubes 14, 14A, respectively. In FIG. 4 and FIG. 5, the same numerals as those in FIG. 1 and FIG. 3 designate the same components.

In the inflator 1', 1A' thus constructed, when the initiator 16 generates the gas, the propellant in the booster 30 initiates the gas generation reaction, and the pressure of the gas generated by the initiator 16 is increased by the gas generated by the booster 30. Therefore, the initiator 16 is capable of generating the shock wave in the tubes 14, 14A, even when the gas pressure is lower than that of the inflators 1, 1A shown in the aforementioned FIG. 1 and FIG. 3 by the amount corresponding to the gas pressure generated by the booster 30. Accordingly, in the inflator 1' and the inflator 1A, it is possible to use the initiator with a further simple structure and a low cost.

Even in a case that the gas storage 2 as the pressure containers 4, 4A has a relatively large capacity, or an elongated shape, or that the pressure of gas stored in the gas storage 2 is set at a relatively high value, it is possible to use an inflator with a relatively low gas pressure to generate the shock wave strong enough to burst the burst disks 8, 8A at the gas jet port 6 by providing the booster 30 in the tubes 14, 14A.

As described above, the present invention provides the inflator capable of generating the shock wave to burst the gas exit of the pressure container for ejecting the gas therefrom, even if the initiator is not capable of generating a high-pressure gas rapidly.

While the invention has been explained with reference to the specific embodiments of the invention, the explanation is illustrative and the invention is limited only to the appended claims.

What is claimed is:

1. An inflator for inflating an airbag, comprising:
   a pressure container filled with a high-pressure gas higher than an atmosphere and having a gas exit at one end thereof, said gas exit being opened upon receipt of a first shock wave, and
   a shock wave generator provided at the other end of the pressure container for generating the first shock wave toward the gas exit, and including a tube having a distal end and a proximal end and being filled with a gas with a pressure lower than that of the high-pressure gas in the pressure container, and an initiator provided at the proximal end of the tube for emitting a second shock wave toward the distal end of the tube when the initiator is actuated, said distal end having a closure disk arranged to open upon receipt of the second shock wave to generate the first shock wave toward the gas exit of the pressure container.

2. An inflator according to claim 1, wherein said pressure container further includes a burst disk for closing the gas exit, said burst disk being opened upon receipt of the first shock wave.

3. An inflator according to claim 1, further comprising a booster disposed in the tube for enhancing the second shock wave emitted from the initiator.

4. An inflator according to claim 1, wherein said distal end of the tube is tapered toward the gas exit.

5. An inflator according to claim 3, wherein said booster is a propellant for inducing a gas generation reaction.

6. An inflator according to claim 1, wherein said initiator is arranged in the tube closed by the closure disk to have the pressure lower than that in the pressure container so that when the initiator is actuated, the second shock is generated in the tube by a pressure difference between a gas generated by the initiator and the gas in the tube to open the closure disk, which generates the first shock wave due to a pressure difference between the gas in the tube and the gas in the pressure container.

* * * * *